US012780690B2

(12) United States Patent
May et al.

(10) Patent No.: US 12,780,690 B2
(45) Date of Patent: Nov. 3, 2026

(54) PORTABLE DEVICE CONFIGURED TO PERFORM PROCESSING OPERATIONS IN RESPECT OF FLUID STORED IN A CONTAINER

(71) Applicant: NUVOE PTY LTD, Enmore (AU)

(72) Inventors: Stuart May, Queenscliff (AU); Michel Fathallah, Queenscliff (AU)

(73) Assignee: NUVOE PTY LTD (AU)

( * ) Notice: Subject to any disclaimer, the term of this patent is extended or adjusted under 35 U.S.C. 154(b) by 326 days.

(21) Appl. No.: 18/559,065

(22) PCT Filed: May 7, 2021

(86) PCT No.: PCT/AU2021/050424
§ 371 (c)(1),
(2) Date: Nov. 6, 2023

(87) PCT Pub. No.: WO2022/232862
PCT Pub. Date: Nov. 10, 2022

(65) Prior Publication Data
US 2024/0228330 A1 Jul. 11, 2024

(51) Int. Cl.
*C02F 1/32* (2023.01)

(52) U.S. Cl.
CPC ...... *C02F 1/325* (2013.01); *C02F 2201/3227* (2013.01); *C02F 2201/326* (2013.01); *C02F 2303/04* (2013.01); *C02F 2307/02* (2013.01)

(58) Field of Classification Search
CPC .............. C02F 1/325; C02F 2201/3227; C02F 2201/326; C02F 2303/04; C02F 2307/02; C02F 1/003; C02F 2201/3222; C02F 2209/03; C02F 2209/42; C02F 2103/02; C02F 2307/04; C02F 2307/10; B65D 2313/04
USPC ......................................... 250/455.11, 504 R
See application file for complete search history.

(56) References Cited

U.S. PATENT DOCUMENTS 2,350,534 A 6/1944 Rosinger
8,872,130 B1 10/2014 Matthews et al.

FOREIGN PATENT DOCUMENTS

KR 1020170131087 A 11/2017

OTHER PUBLICATIONS

"NUVOE: The world's first water purification upgrade for your bottle" https://web.archive.org/web/20210119075336/https://mynuvoe.com/, published on Jan. 19, 2021 per Wayback Machine (Year: 2021).*

(Continued)

*Primary Examiner* — Michael Maskell

(57) ABSTRACT

The present invention relates, in various embodiments, to a portable device configured to perform processing operations in respect of fluid stored in a container. For example, some embodiments include a device which is configured to be inserted into a container holding fluid, and remain at a predefined level within that container. In some embodiments that predefined level is determined by the positioning of a magnet on a sidewall of the container. Although the present invention is described primarily in connection with such examples, it will be appreciated that further embodiments find wider application.

20 Claims, 12 Drawing Sheets

(56) References Cited

OTHER PUBLICATIONS

NUVOE: The worldas first water purification upgrade for your bottlea https://web.archive.org/web/20210119075336/https://mynuvoe.com/, published on Jan. 19, 2021 per Wayback Machine (Year: 2021).*

* cited by examiner

PORTABLE DEVICE CONFIGURED TO PERFORM PROCESSING OPERATIONS IN RESPECT OF FLUID STORED IN A CONTAINER

FIELD OF THE INVENTION

The present invention relates, in various embodiments, to a portable device configured to perform processing operations in respect of fluid stored in a container. For example, some embodiments include a device which is configured to be inserted into a container holding fluid, and remain at a predefined level within that container. In some embodiments that predefined level is determined by the positioning of a magnet on a sidewall of the container. Although the present invention is described primarily in connection with such examples, it will be appreciated that further embodiments find wider application.

BACKGROUND OF THE INVENTION

Any discussion of the background art throughout the specification should in no way be considered as an admission that such art is widely known or forms part of common general knowledge in the field.

Containers, such as bottles, which are configured to perform processing operations on a fluid are known. These include, for example, bottles with in-built filtration, and bottles with in-built UV treatment lights (for example where those UV treatment lights are stored in a lid of the container). Various known technologies are limited in terms of the forms of container on which they are able to operate. For example, in the case of arrangements in which a UV light purification system is provided in a container lid, that is only able to be used with containers onto which that lid fits.

It is an object of the present invention to overcome or ameliorate at least one of the disadvantages of the prior art, or to provide a useful alternative.

SUMMARY OF THE INVENTION

Example embodiments are described below in the section entitled "claims", and in the section entitled "detailed description".

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF DRAWINGS

Embodiments of the invention will now be described, by way of example only, with reference to the accompanying drawings in which.

DETAILED DESCRIPTION

Figure 1A:
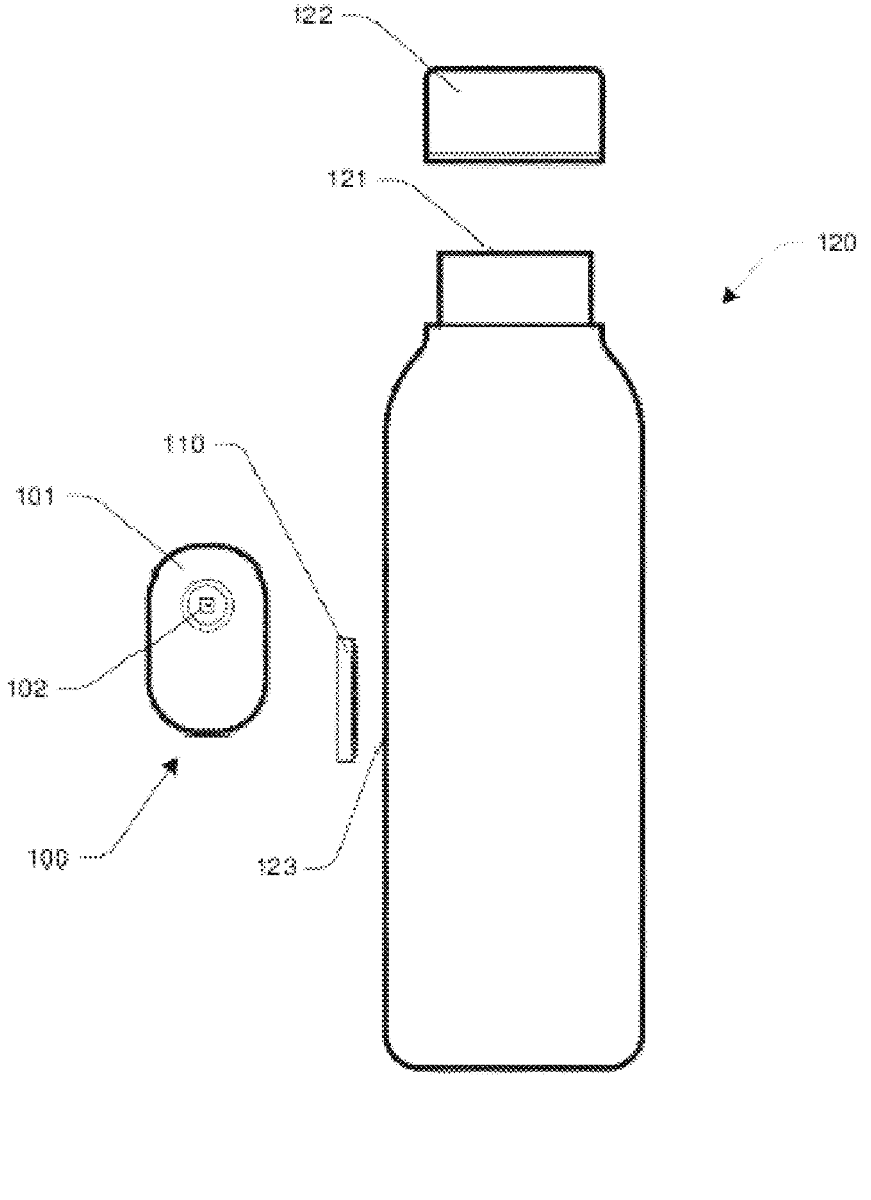
FIG. 1A illustrates a portable water purification device according to one embodiment, along with a magnetic mount and an example container.

The present invention relates, in various embodiments, to a portable device configured to perform processing operations in respect of fluid stored in a container (such as a portable water purification device). For example, some embodiments include a device which is configured to be inserted into a container holding fluid, and remain at a predefined level within that container. In some embodiments that predefined level is determined by the positioning of a magnet on a sidewall of the container. Although the present invention is described primarily in connection with such examples, it will be appreciated that further embodiments find wider application.

As used herein, the term "processing operation", as applied to a fluid, describes an operation by which attributes of the fluid are intentionally modified. Examples described herein are primarily focused on water purification, for example purification via the applicant of UV light to the fluid (via fluid processing components in the form of UV lights). However, there are various other forms of operation other than purification which may be performed, using different fluid processing components. For instance, these may include: heating; cooling; ionisation; flavouring; agitation, filtration, and the like. As such, whilst examples described herein focus on devices which include fluid processing components in the form of UV lights, it will be appreciated that in further embodiments a wide range of other fluid processing components may be used (for example heating/cooling elements, filtration pump devices; and the like).

Various embodiments relate to devices, being portable devices, configured to process fluid in a container. These devices each include a device body, which is configured to be inserted into the container. For example, the device body is configured to be inserted though the main aperture of a conventional reusable bottle (typically an aperture which is configured to be sealed via a lid), which tend to have an aperture diameter of greater than about 40 mm (often around 80 mm to 120 mm). In a preferred embodiment the device body has a diameter about a longitudinal axis of between 30 mm and 40 mm. The device may have a greater length dimension, for example between about 120% and 180% of the diameter (on some cases about 150%). It will be appreciated that such device sizing is useful in optimising a range of containers into which the device body is able to be inserted, whilst reducing potential choking hazards in the event that the device was to escape from the container into a user's mouth.

The device body provides a level setting component, which is configured to cause the device to stabilise at a predefined level inside the container. This predefined level may be defined in a variety of ways, including:

Relative to the container, for example a predefined level defined on a sidewall of the container. In some embodiments, the position on the sidewall of the container is defined by a location of a sidewall magnet. This may be a sidewall magnet which is built into the container sidewall. However, in examples provided further below, the sidewall magnet is provided on a portable unit which is selectively positioned by a user at the position on the sidewall of the container which is presented externally of the container, thereby to define the predefined level. As such, the sidewall magnet is configured to be positioned on a variety of different containers, thereby to enable utilisation of the device with those containers.

Relative to a level of fluid in the container. This is optionally arranged such that such that device body sinks to the predefined level within the fluid based on buoyancy properties of the device body.

In either case, the device body is configured such that at least a portion of the device body is, during intended use, immersed in fluid contained withing the container.

One or more fluid processing components are provided on the body. These are configured to perform fluid processing in respect of a fluid contained within the container, following insertion of the device body into the container. The one or more fluid processing components are configured to process fluid both into a region of fluid above the device body, and a region of fluid below the device body, when the predefined level is below a level of fluid in the container.

The fluid processing components may include UV lights for water purification, preferably being circumferentially spaced about the device body, around the longitudinal axis. Other components may be used in addition and/or as alternatives. These include components for operations such as: heating; cooling; ionisation; flavouring; agitation, filtration, and the like.

In use, a user inserts the device body into a container (for example by dropping the device through an upper main aperture of the container), preferably following filling or partially filling the container with fluid (such as water). The processing components are activated to perform processing operations in respect of the fluid. There are a range of approaches by which these processing components are activated, and any one or more of the following may be used by a given embodiment:

A manual activation component, such as a switch or button. This optionally operates to activate the processing components for a predefined period of time.

A motion-based activation component, for example using a sensor such as an accelerometer or IMU. This in some embodiments is configured to activate the processing components for a predefined period of time based on identification of a "shaking" motion. Preferably, the device is first switched into a "ready" operational state prior to insertion, in which state the device is configured to monitor for the "shaking" motion. In another embodiment, the motion may be a transition from vertical sinking to horizontal magnetic stabilizing (for example where a device transitions 90 degrees between insertion and stabilization). It is mentioned that motion-based activation has an added benefit of agitating the fluid prior to activation of processing (this may improve effectiveness of purification, for example in the context of microorganisms being sterilised via UV light). In a preferred embodiment, the device includes a microprocessor configured to recognise a motion signal representative of intentional shaking, as opposed to motion signals which may be representative of general transportation.

A fluid-detection based activation component, which is configured to activate the processing components for a predefined period of time upon detection that the component is immersed in fluid.

A pressure based activation component, which is configured to activate the processing components for a predefined period of time upon detection of a threshold external pressure (which is set to indicate that the device is adequately immersed into a fluid).

A light detection based approached, for example via an ambient light sensor. This is in some embodiments configured to activate the processing components in response to detected light conditions, for example activation in response to light conditions representing closing of a container lid.

A magnetic engagement-based approach, for example a hall-effect sensor, which identifies presence of magnetic engagement (which is representative of the device being in position for activation).

Other activation components may additionally/alternately be present. In some embodiments, one or more components are configured to detect a filling/drinking cycle, thereby to control activation relative to such a cycle. Via such an approach, sensor-based predictions determine whether a device is in a filled state container, or a container that is in the process of being emptied (e.g. via drinking over numerous openings and tipping motions). Activation of processing components is configured to occur only for a filled state container.

In some embodiments, device componentry/logic is configured to manage period of activation. This may include a closed-loop arrangement, for example a sensor configured to identify a state of processing. Examples include:

A temperature sensor in combination with water heating/cooling elements, thereby to deactivate processing when a threshold temperature is achieved.

A conductivity sensor (e.g. electrodes) configured to monitor water conductivity, in combination with water purification elements. Conductivity is used as a proxy measurement for water purity.

Other sensors, for example microorganism sensors and the like, which are used to determine purity relative to microorganism presence.

Figure 1B:
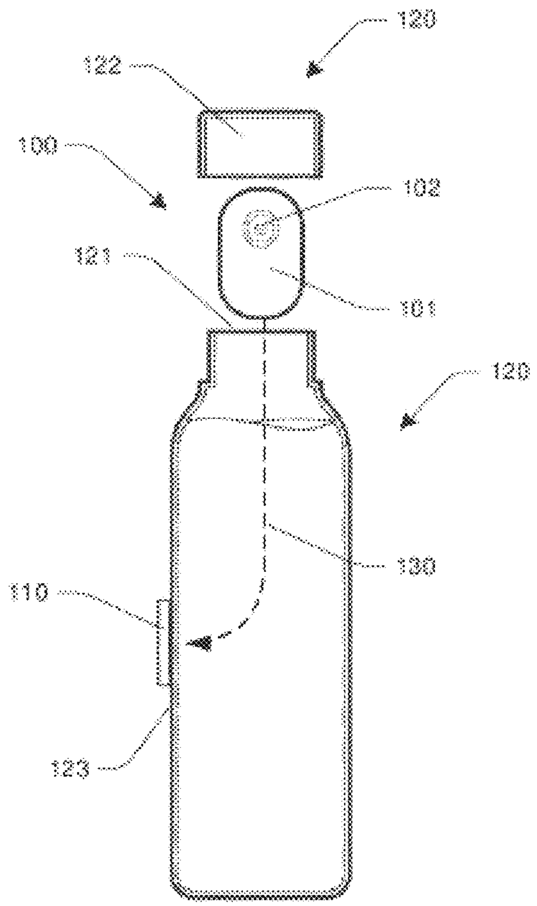
FIG. 1B and FIG. 1C show an installation operation of the device of FIG. 1A.
Figure 1C:
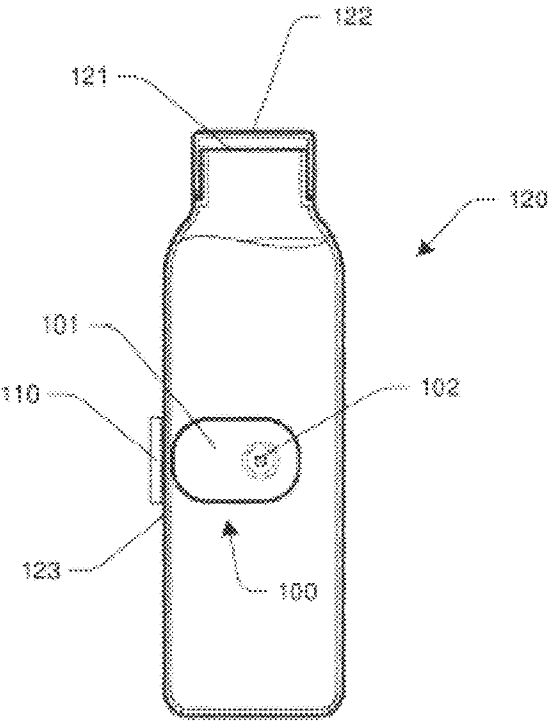

FIG. 1A illustrates a device 100 according to one embodiment, being a device that is configured to be inserted into a container such as illustrated container 120. Device 100 includes a longitudinally elongate body 101, and a plurality of fluid processing components in the form of UV lights 101. As best shown in FIGS. 1B and 1C, device body 101 is dropped longitudinally into container 120 via a top aperture 121, and sinks into fluid contained inside container 120. A sidewall magnet 110 is positioned a sidewall 123 of container 120. A magnet positioned at an end of device body 101 is attracted to sidewall magnet 110, causing the device to follow a trajectory approximately represented by line 130. This causes the longitudinal axis of body 101 to rotate by 90 degrees, to become perpendicular to the axis of insertion and become stabilised at a level corresponding to sidewall magnet 110 as a result of magnetic attractive forces, as shown in FIG. 1C. A magnet of between about 3 kgf and 10 kgf is preferred, preferably around 7 kgf. In the illustrated embodiment, a lid 122 is then engaged to bottle 120 thereby to seal aperture 121, and the bottle shaken. During this shaking, device 100 remains in its stable position as a result of magnetic attraction to sidewall magnet 110. However, an IMU provided on a circuit board within device body 101 is configured to recognise the shaking motion, and in response activate UV lights 102 for a predefined period of time, thereby to perform a purification operation in respect of the fluid in container 120. Other activation means may be available, for example an activation button provided on device body 110 (and optionally an ambient light sensor). Following purification, a user drinks the fluid (optionally with the device still in place). In a preferred embodiment, the device is configured to differentiate between: (i) IMU signals representative of vigorous intentional shaking; and (ii) IMU signals representative of general transportation/usage. For example, this may be based upon setting acceleration thresholds and the like. In some embodiments the shaking motion required to activate the UV lights is relatively specific, thereby to assist in a defined motion parameters for activation which are detectable via the IMU. This may be a motion whereby a user holds the device in one hand, and rotates at the wrist/forearm such that the container reciprocally rotates about an axis substantially defined by the user's forearm.

In some embodiments, one or more additional sensors (such as moisture and/or light sensors, and/or a hall-effect sensor) are employed, thereby to assist in a determination process which triggers UV light activation. This is configured thereby to prevent activation of UV light at inappropriate times. For example, in one embodiment a hall-effect sensor is used to ensure that the device is in magnetic engagement with the anchor, and that is combined with a shaking motion to activate the UV lights.

In another embodiment a moisture sensor is used to ensure that the device is submerged in fluid, and that is combined with a shaking motion to activate the UV lights. In another embodiment an ambient light sensor is used to detect that the device is in a closed container, and that is combined with a shaking motion to activate the UV lights. A combination of these approaches may be used. In further embodiments a combination of these other sensors is used in place of an IMU (for example a hall-effect sensor and a moisture sensor).

Positioning the device approximately mid-depth in the container relative to the water level allows the UV light to maximize its effect on the fluid, noting that effectiveness decreases with distance. Furthermore, having the UV light activated in response to shaking results in agitation of particulates within the water, assisting in purification.

In some embodiments, a user manually removes sidewall magnet 110 from sidewall 123, thereby releasing device 100 from magnetic engagement. Device 100 is then easily removed from container 120 (for example by inverting the container, for instance following consumption of the liquid). In some embodiments, sidewall magnet 110 is permanently (or semi-permanently) affixed to the sidewall, and the user employs alternate means to overcome the magnetic force thereby to release 100 from magnetic engagement, thereby to allow removal from the container (for example a vigorous shake when the container is empty).

It will be appreciated that device 100 of FIG. 1A, in combination with sidewall magnet 110, can be used with a variety of containers. For example, a filtration jug is shown in FIG. 2F. Other suitable containers may include contains formed of various materials (aluminium, glass, plastic, etc.), hydration bladders, cups, bottles, sports bottles, and so on. Main limiting features will be: (i) diameter of an aperture available for device insertion; and (ii) sidewall thickness (assuming that magnetic engagement is to be used).

Figure 2A:
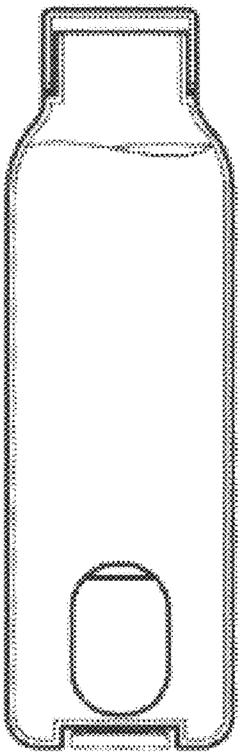
FIG. 2A to FIG. 2F illustrate further example embodiments.

FIG. 2A to FIG. 2E illustrate example alternate embodiments:

In FIG. 2A, the sidewall magnet is positioned in a base of the container.

Figure 2B:
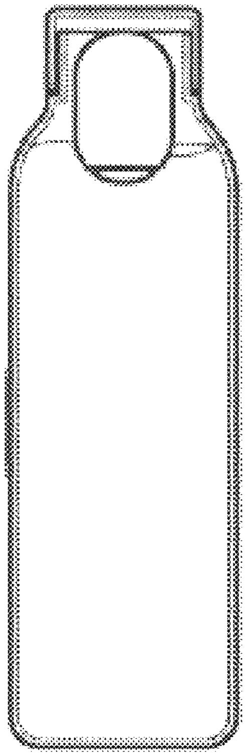
Figure 2C:
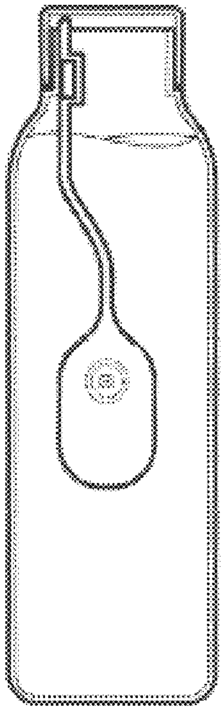

In FIG. 2B, the sidewall magnet is positioned in a lid of the container.

in FIG. 2C, the device is non-buoyant, and a tether is used to control a depth of insertion. This tether attaches proximal the container opening for example coupled to the lid or an alternate magnetic arrangement.

Figure 2D:
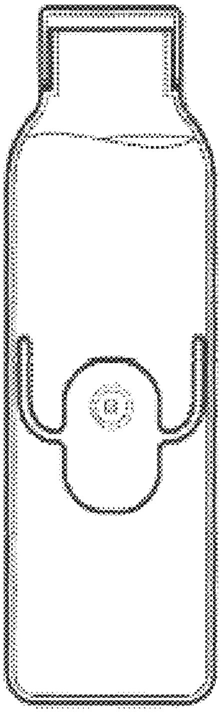

In FIG. 2D, the device includes spring loaded arms which engage with internal sidewalls of the container.

Figure 2E:
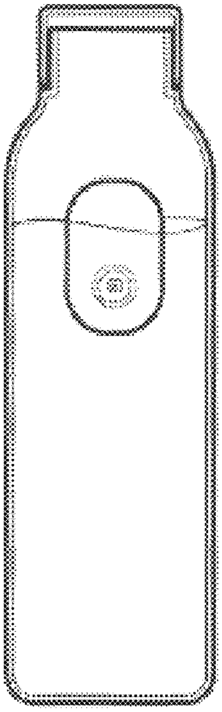
Figure 2F:

In FIG. 2E, the device is partially buoyant, such that the UV lights are submerged, but without the device sinking to the bottom of the fluid in the container.

FIG. 4A to FIG. 4F illustrate a device according to a further embodiment. This device is similar in function to device 100 of FIG. 1A.

Figure 4A:
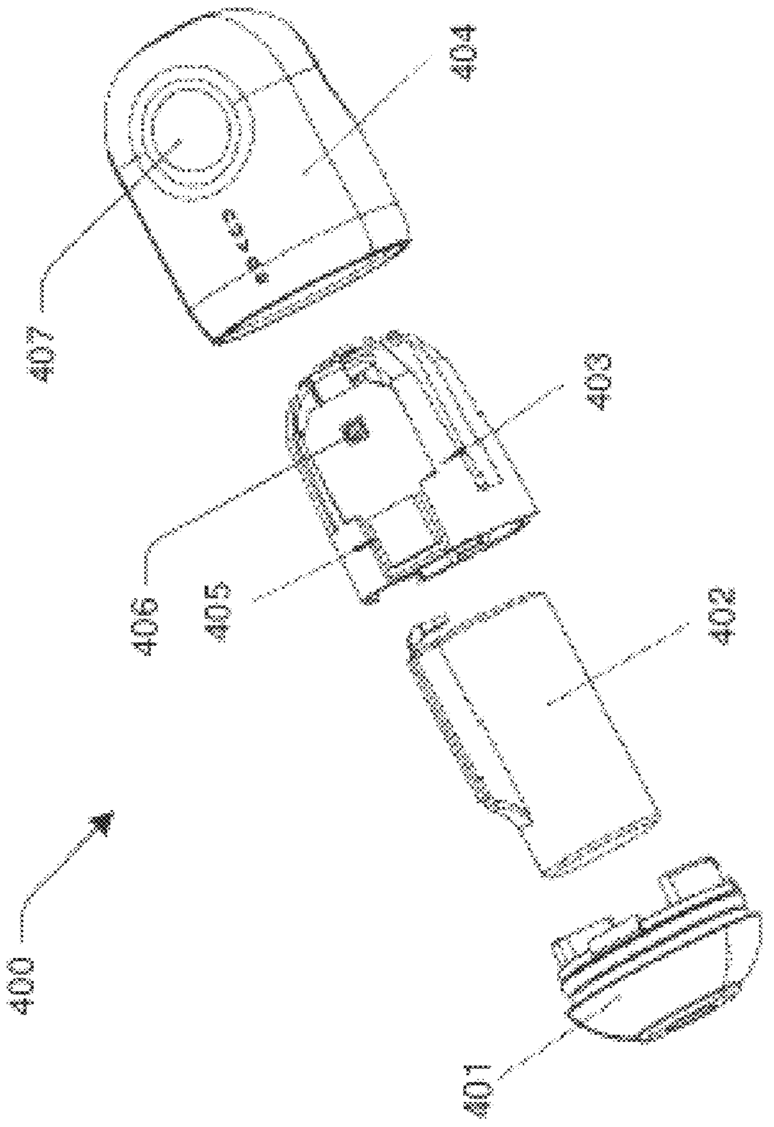
FIG. 4A illustrates a further portable water purification device according to one embodiment, shown in an exploded view.
Figure 4B:
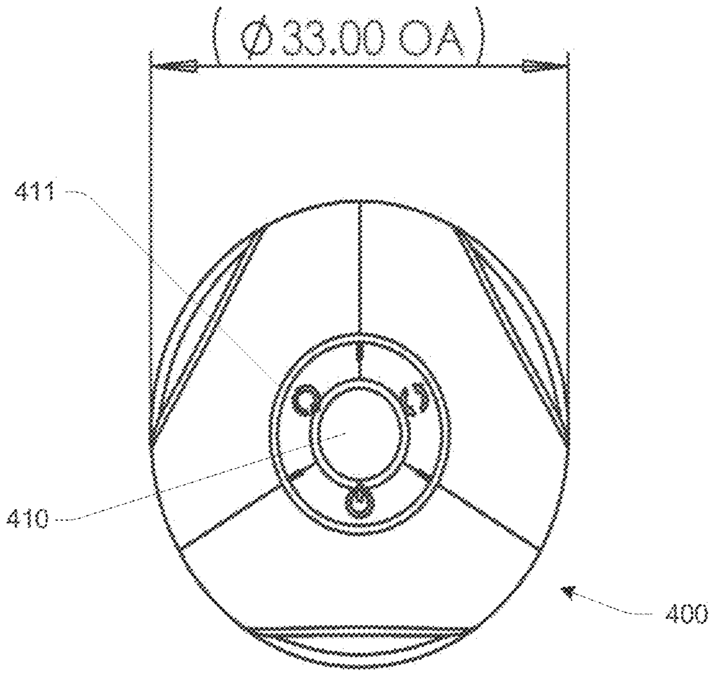
FIG. 4B provides a top view of the device of FIG. 4A.
Figure 4C:
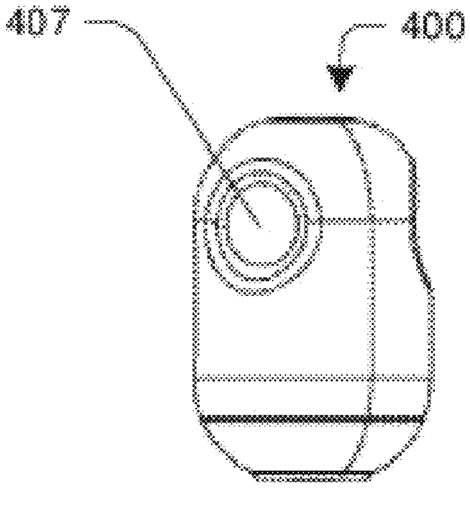
FIG. 4C provides a side view of the device of FIG. 4A.
Figure 4D:
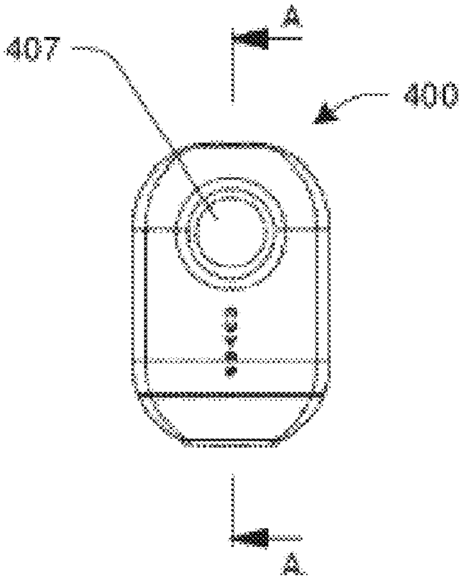
FIG. 4D provides a further side view of the device of FIG. 4A.
Figure 4E:
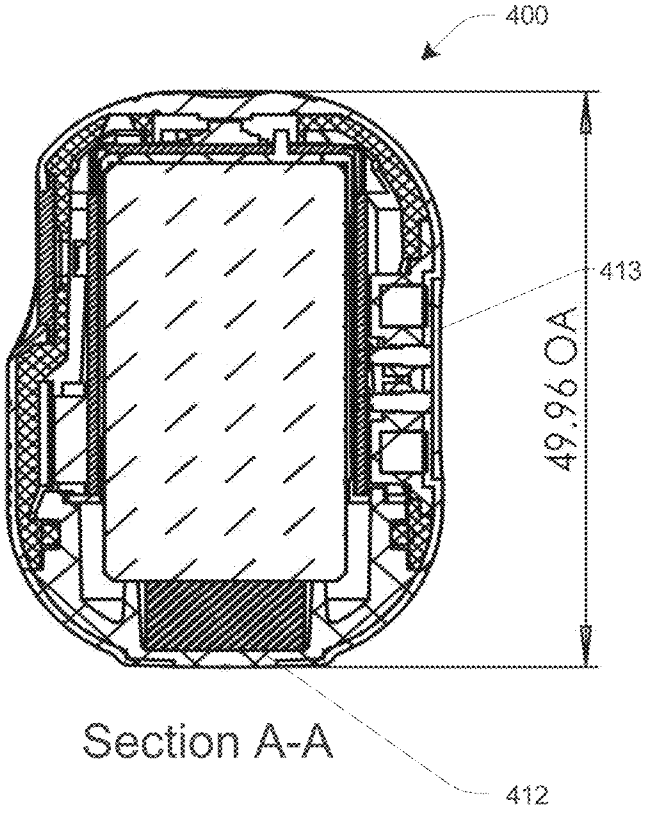
FIG. 4E provides a cross section along the line A-A of FIG. 4D.
Figure 4F:
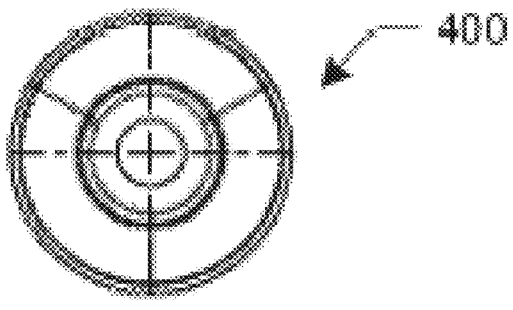
FIG. 4F provides a bottom view of the device of FIG. 4A.

In the exploded view of FIG. 4A, various modular components are illustrated. A base component 401 is moulded from BPA free plastics and configured to house a magnet 412. For example, this may be a N52UH Neodymium magnet with a rating of approximately 7 kgf. A power supply component 402 is configured power the device, for example a rechargeable lithium-ion battery. A battery cover member 403 is configured to house snap lock engage with component 403, thereby to house battery. A printed circuit board (PCB) 405 is mounted to the battery cover. This PCB provides components including a processor, IMU (for shake activation), battery, press-button component (which is activated by pressing a button 410), LED lights 410 (for showing device operation/status), a terminal (e.g. for battery charging) 413, which may be a magnetic POGO pin type connector, and UV lights 406. A cover 404, moulded from BPA free plastics, is engaged with base component 401 thereby to seal the unit, such that the unit is submersible in fluid without ingress of fluid into the chamber defined inside components 401 and 404. Cover 404 also provides lenses 407, which overlie UV lights 406. These are preferably formed from materials such as high-grade quartz glass (e.g. JGS2), or moulded from High UVC transmission polymers.

Figure 5:
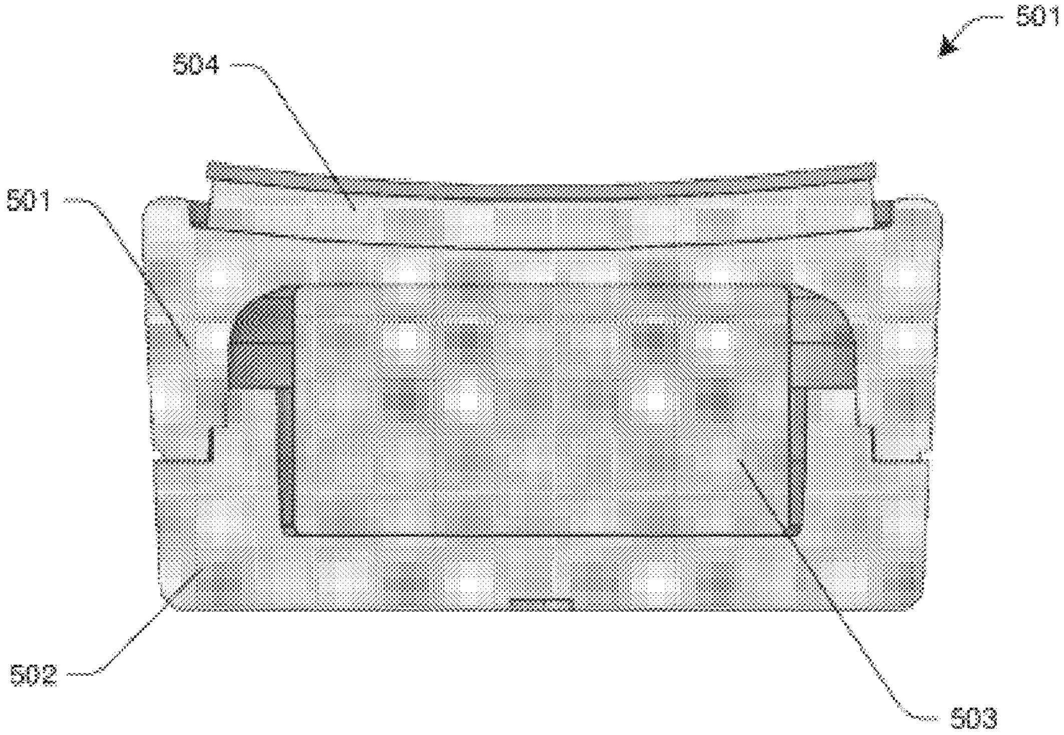
FIG. 5 shows an example magnetic sidewall anchor unit which is configured for use with the device of FIG. 4A.

FIG. 5 illustrates, in cross section, an example sidewall magnet for use with the device of FIG. 4A. This includes a body formed from a first component 501 and second component, which connect to house a magnet 503, preferably with about 7 kg pull force. A tape assembly 504, for example formed from double-sided nano tape with a release liner, is mounted to component 501. In use, this is sandwiched between component 501 and the container sidewall. As shown, this is curved in cross-section thereby to better profile against common containers. In practice, a user may procure multiple signal magnets, and affix those to respective containers. The user need only procure a single processing device, and can then use that with all of those containers.

Figure 6:
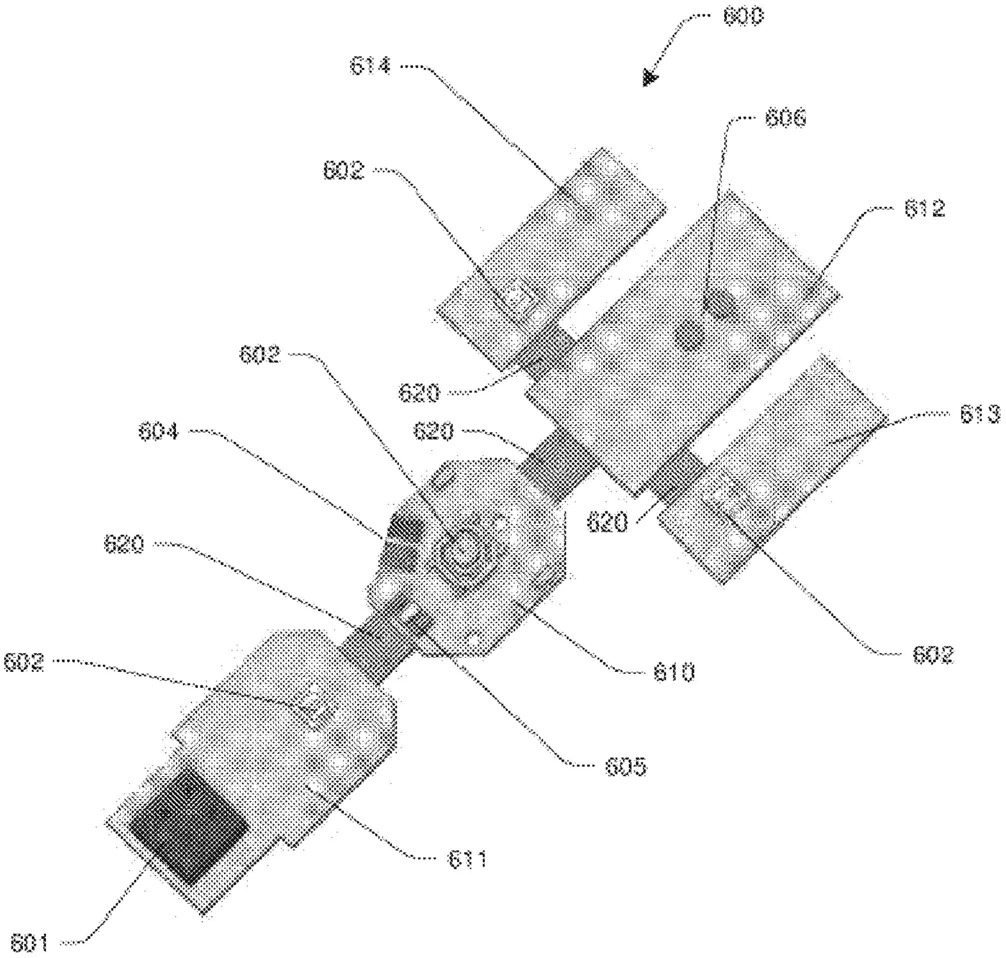
FIG. 6 shows a PCB for use with the device of FIG. 4A.

FIG. 6 illustrates an example PCB 600 according to one embodiment, configured for use with the device of FIG. 4A to FIG. 4E. The PCB includes a plurality of rigid regions 610-614, interconnected by flexible regions 620. This allows the PCB to fold into the configuration shown in FIG. 4A, in which it is mounted to battery cover 403. In this arrangement:

Central region 610 is configured to be mounted on top of the battery cover, thereby to provide a top press button component 602 which is used to access various device functions (for example activation, sleep mode, and so on). This region also provides LED arrays 604 and 605, which show device status (e.g. charging, mode, etc.).

Side region 611 provides a processing unit 601 (with onboard IMU, microprocessor and memory), and a UV light 602 which is configured to emit light in the UV-C spectrum. Side regions 613 and 614 also provide similar UV lights 602, and it will be appreciated from the physical arrangement that the three UV lights 602 these are positioned circumferentially when the PCB is folded and mounted to the battery cover.

Figure 7:
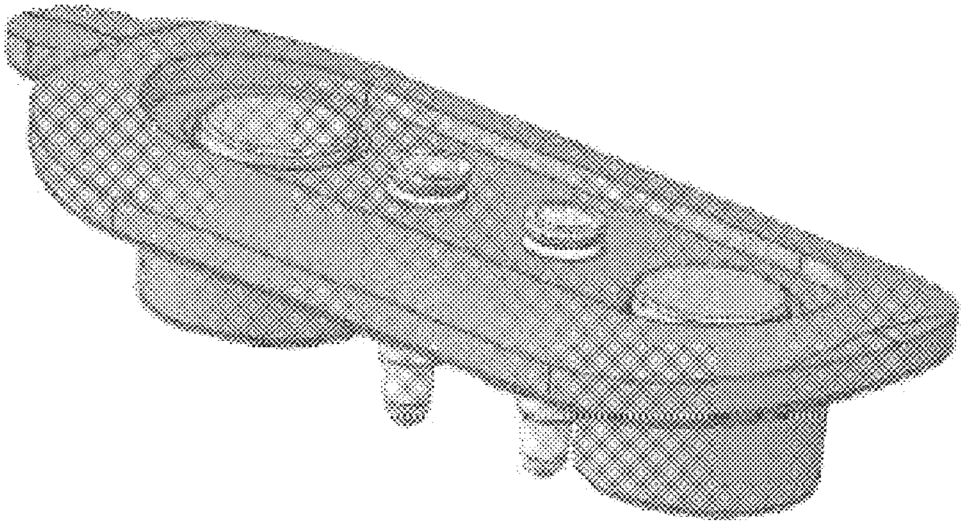
FIG. 7 shows a POGO connector for use with the device of FIG. 4A.

Side region 612 is disposed between side regions 613 and 614, and provides terminals for connection to a connector interface. For example, in some embodiments the connector interface is a POGO style connector such as that shown in FIG. 7. This form of connector is used to provide a waterproof connector interface which provides terminals externally of the device (see FIG. 4E). Two terminals are shown in the example of FIG. 6 and FIG. 7, and these may be used for charging. In further embodiments additional terminals are provided, for example to enable interaction with processing unit 610 (e.g. for diagnostics and/or firmware modifications).

It will be appreciated that FIG. 6 provides an example only, and that a wide range of PCB designs may be used. Furthermore, alternate/additional components may be provided on the PCB in further embodiments.

Figure 8:
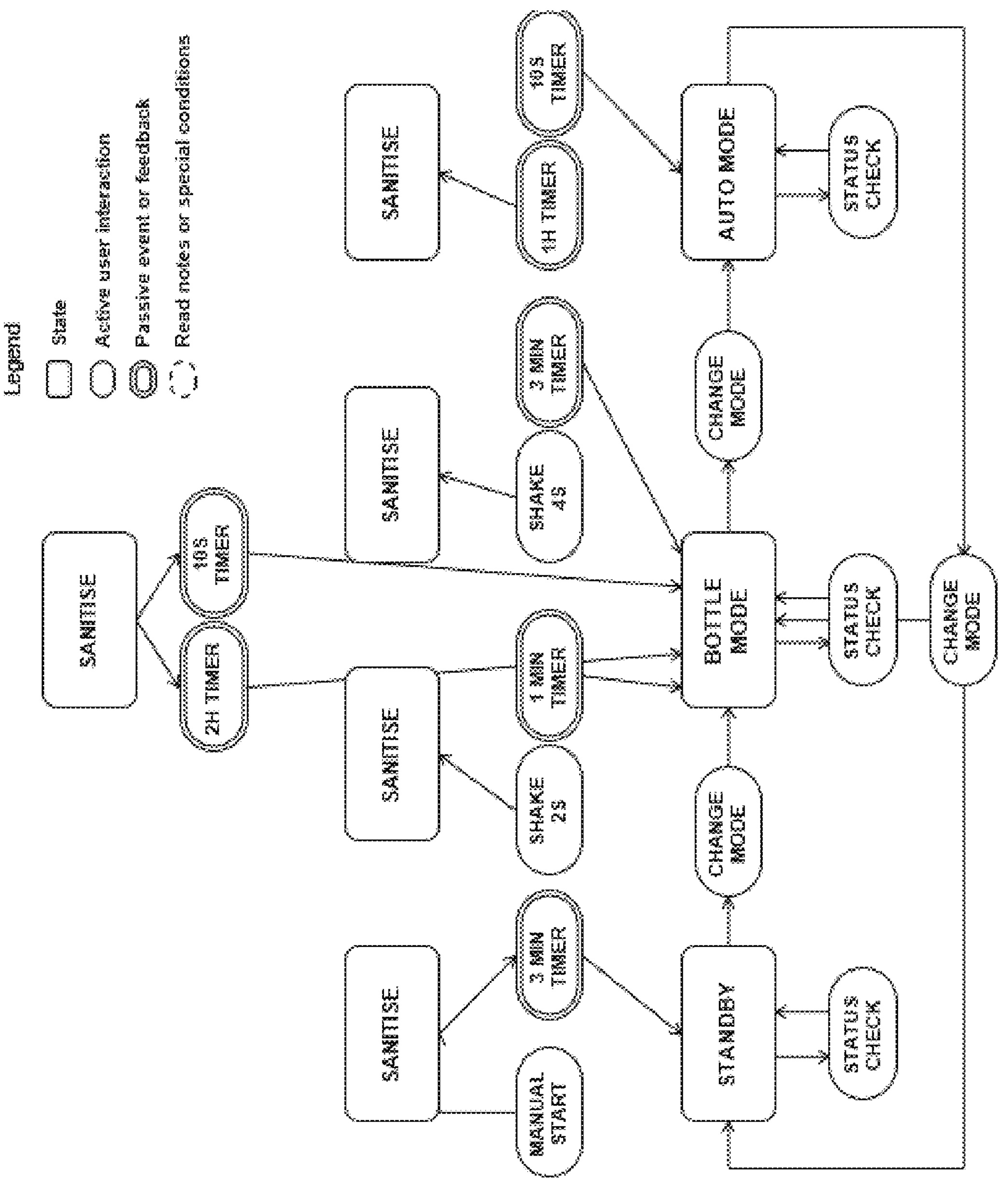
FIG. 8 shows an example process flow.

FIG. 8 illustrates a process flow according to one embodiment. In this example, the device is configured to operate in three modes:

A standby mode, in which UV lights are able to be manually activated for a 3-minute cycle, but otherwise the device remains dormant in a low power mode.

A bottle mode, into which the device is progressed prior to insertion into a bottle/container. In some cases transition to this mode is automated based on a hall-effect sensor and/or other sensor (e.g. ambient light/moisture/pressure). In this mode, the UV lights are activated based on a shaking motion (1 minute for a 2-second shake, or 3 minutes for a 4 second shake). The lights are also activated on a 2-hour repeating cycle, with a ten-second timer, thereby to maintain purification over time.

An auto mode, wherein the UV lights activate for 10 seconds each hour.

It will be appreciated that this is example operation only, and that the time periods noted are varied for further embodiments.

It should be appreciated that the above disclosure provides advances in the field of fluid processing, for example water purification. In particular, the present technology allows for a single water portable processing device to be used with a wide range of containers having different properties. Furthermore, a single device can be used in multiple containers in sequence, this in some examples allowing for purification of water for multiple persons.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A portable device configured to enable processing of fluid in a container, the device including:

a non-buoyant device body, which is configured to be inserted into the container;

a magnet housed in the body, wherein the magnet is configured to provide a level setting component which is configured to cause the device to stabilise at a predefined level inside the container, the predefined level being determined by positioning of a separate magnetic anchor on an external side of a sidewall of the container; and one or more fluid processing components which are configured to perform fluid processing in respect of the fluid contained within the container, following insertion of the device body into the container, such that, in use, the device is dropped into the fluid and sinks to the predefined level, at which point it becomes stabilised against an inside surface of the sidewall of the container via magnetic attractive forces between the magnet housed in the body and the separate magnetic anchor.

2. A device configured to process fluid in a container, the device including:

a device body, which is configured to be inserted into the container;

a level setting component provided on the device body, which is configured to cause the device to stabilise at a predefined level inside the container; and one or more fluid processing components which are configured to perform fluid processing in respect of a fluid contained within the container, following insertion of the device body into the container.

3. The device according to claim 2 wherein the predefined level is defined relative to a position on a sidewall of the container.

4. The device according to claim 3 wherein the position on the sidewall of the container is defined by a location of a sidewall magnet.

5. The device according to claim 4 wherein the sidewall magnet is provided on a portable unit which is selectively positioned by a user at the position on the sidewall of the container which is presented externally of the container, thereby to define the predefined level.

6. The device according to claim 4 wherein the sidewall magnet is configured to be positioned on a variety of different containers, thereby to enable utilisation of the device with those containers.

7. The device according to claim 4 wherein the magnet is integrated into the sidewall of the container.

8. The device according to claim 2 wherein the predefined level is defined relative to a level of fluid in the container, such that device body sinks to the predefined level within the fluid based on buoyancy properties of the device body.

9. The device according to claim 2 wherein the device includes one or more activation components configured to trigger activation of the one or more fluid processing components in response to a predefined stimulus.

10. The device according to claim 9 wherein the predefined stimulus is based on device motion.

11. The device according to claim 10 wherein the device motion includes a shaking motion.

12. The device according to claim 10 wherein the device motion includes a levelling motion.

13. The device according to claim 10 wherein the one or more activation components include an accelerometer or IMU.

14. The device according to claim 10 wherein the predefined stimulus is based on detection of fluid.

15. The device according to claim 10 wherein the predefined stimulus is based on any one or more of: measurement of pressure; measurement of ambient light; detection of a filling/drinking cycle.

16. The device according to claim 2 wherein the one or more fluid processing components include one or more ultraviolet lights configured to perform fluid purification/sterilisation functionality.

17. The device according to claim 16 including a plurality of ultraviolet lights which are circumferentially spaced about the device body, thereby to emit ultraviolet light both into a region of fluid above the device body, and a region of fluid below the device body, when the predefined level is below a level of fluid in the container.

18. The device according to claim 2 wherein the one or more fluid processing components are configured to process fluid both into a region of fluid above the device body, and a region of fluid below the device body, when the predefined level is below a level of fluid in the container.

19. The device according to claim 2 wherein the body is elongate relative to a longitudinal axis.

20. The device according to claim 19 wherein the device body is configured to be inserted with its longitudinal axis substantially aligned with a longitudinal axis of an opening of the container, and stabilize in a configuration where its longitudinal axis is substantially perpendicular to the longitudinal axis of an opening of the container.

* * * * *